US012703151B2

(12) United States Patent
Nauka et al.

(10) Patent No.: US 12,703,151 B2
(45) Date of Patent: Aug. 11, 2026

(54) ADDITIVE MANUFACTURING WITH FUSING AND WARMING ENERGY SOURCES

(71) Applicant: Peridot Print LLC, Palo Alto, CA (US)

(72) Inventors: Krzysztof Nauka, Palo Alto, CA (US); Aja Hartman, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 0 days.

(21) Appl. No.: 18/834,824

(22) PCT Filed: Feb. 2, 2022

(86) PCT No.: PCT/US2022/014967

§ 371 (c)(1), (2) Date: Jul. 31, 2024

(87) PCT Pub. No.: WO2023/149874

PCT Pub. Date: Aug. 10, 2023

(65) Prior Publication Data

US 2025/0153436 A1 May 15, 2025

(51) Int. Cl.
*B29C 64/282* (2017.01)
*B29C 64/165* (2017.01)
(Continued)

(52) U.S. Cl.
CPC .......... *B29C 64/282* (2017.08); *B29C 64/165* (2017.08); *B29C 64/393* (2017.08);
(Continued)

(58) Field of Classification Search
CPC .................................................... B29C 64/282
See application file for complete search history.

(56) References Cited

U.S. PATENT DOCUMENTS 8,646,877 B2 * 2/2014 Thompson ......... B41J 11/00214 347/102
10,406,744 B2 9/2019 Gutierrez et al.
(Continued)

FOREIGN PATENT DOCUMENTS

WO 2007/114895 A2 10/2007
WO 2015/106816 A1 7/2015
(Continued)

OTHER PUBLICATIONS

National Aeronautics and Space Administration, Science Mission Directorate. (2010). Visible Light. Retrieved [insert date—e.g. Aug. 10, 2016], from NASA Science website: http://science.nasa.gov/ems/09_visiblelight (Year: 2010).*
(Continued)

*Primary Examiner* — Timothy Kennedy
(74) *Attorney, Agent, or Firm* — Michael Dryja

(57) ABSTRACT

In one example in accordance with the present disclosure, an additive manufacturing system is described. The additive manufacturing system includes a build material deposition device to deposit a layer of a powder build material. The additive manufacturing system includes a fusing agent deposition device to deposit a fusing agent on a first portion of the layer that is to form a 3D object and a fusing energy source to deliver energy absorbed by the fusing agent to heat the first portion to a melting temperature of the powder build material. The additive manufacturing system also includes a warming energy source to deliver energy absorbed by a second portion of the layer to a temperature below the melting temperature. In this example, the second portion includes a warming agent and the fusing energy source and the warming energy source have different emission spectra.

13 Claims, 8 Drawing Sheets

(51) Int. Cl.

| | |
|---|---|
| ***B29C 64/393*** | (2017.01) |
| ***B33Y 10/00*** | (2015.01) |
| ***B33Y 30/00*** | (2015.01) |
| ***B33Y 50/02*** | (2015.01) |

(52) U.S. Cl.

CPC ............... *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2014/0252685 | A1 | 9/2014 | Stucker et al. | |
| 2015/0306820 | A1 | 10/2015 | Colin et al. | |
| 2016/0332376 | A1* | 11/2016 | Ramirez Muela | G05B 19/19 |
| 2017/0274594 | A1* | 9/2017 | Ng | B33Y 30/00 |
| 2017/0334140 | A1* | 11/2017 | Andersson | B29C 64/357 |
| 2017/0355137 | A1* | 12/2017 | Ederer | B29C 64/165 |
| 2018/0015663 | A1 | 1/2018 | Zhao et al. | |
| 2018/0333914 | A1* | 11/2018 | Rudisill | B29C 64/165 |
| 2018/0354191 | A1 | 12/2018 | Nauka et al. | |
| 2019/0054691 | A1 | 2/2019 | Abbott, Jr. et al. | |
| 2020/0262155 | A1 | 8/2020 | Huang et al. | |
| 2020/0361143 | A1* | 11/2020 | Veis | B29C 64/165 |

FOREIGN PATENT DOCUMENTS

| | | | | |
|---|---|---|---|---|
| WO | WO-2016119898 | A1 * | 8/2016 | B29C 64/264 |
| WO | 2018/194656 | A1 | 10/2018 | |
| WO | WO-2018194591 | A1 * | 10/2018 | B29C 64/393 |
| WO | WO-2018194647 | A1 * | 10/2018 | B29C 64/307 |
| WO | 2019/245516 | A1 | 12/2019 | |
| WO | WO-2020131013 | A1 * | 6/2020 | B22F 5/007 |

OTHER PUBLICATIONS

AAT Bioquest, Inc. (Feb. 6, 2026). Quest Graph™ Absorption [Tartrazine Acid Yellow 23]. AAT Bioquest. https://www.aatbio.com/absorbance-uv-visible-spectrum-graph-viewer/tartrazine_acid_yellow_23 (Year: 2026).*

CIE International Commision on Illuminiation (Feb. 5, 2026); https://cie.co.at/eilvterm/17-21-003 (Year: 2026).*

* cited by examiner

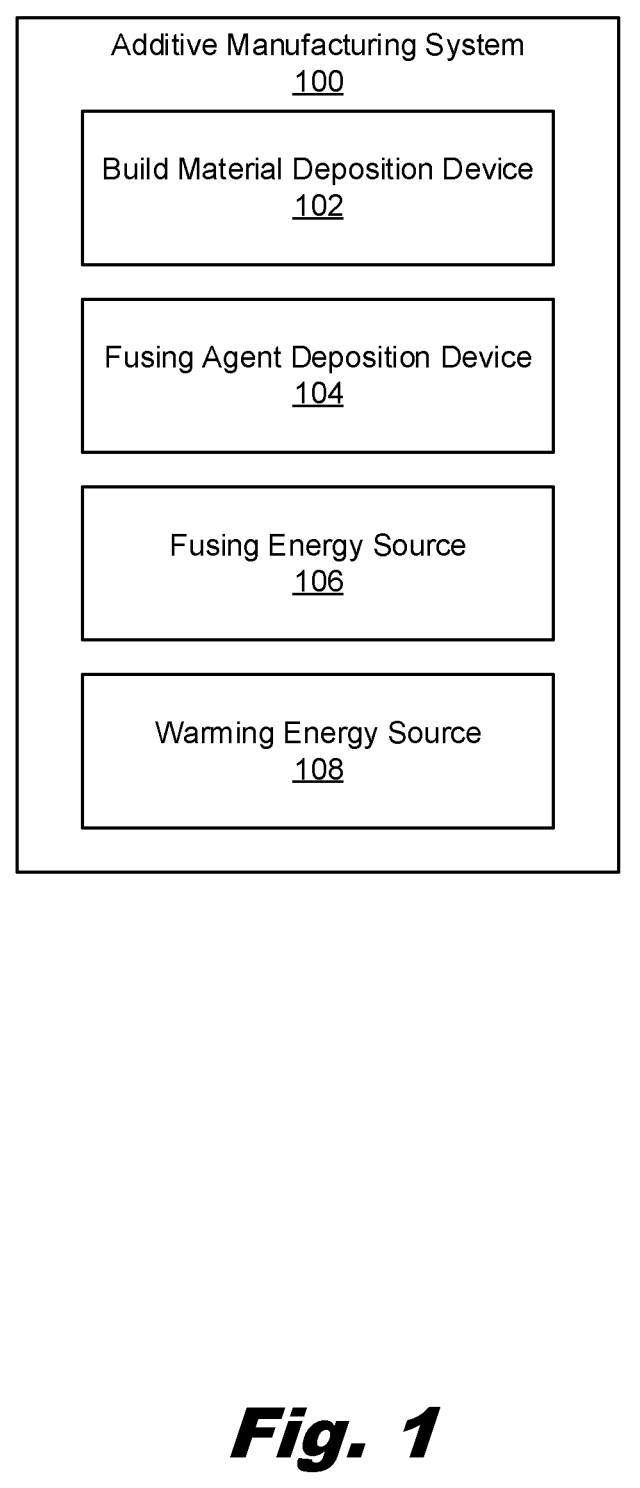

Additive Manufacturing System
100

Build Material Deposition Device
102

Fusing Agent Deposition Device
104

Fusing Energy Source
106

Warming Energy Source
108

*Fig. 1*

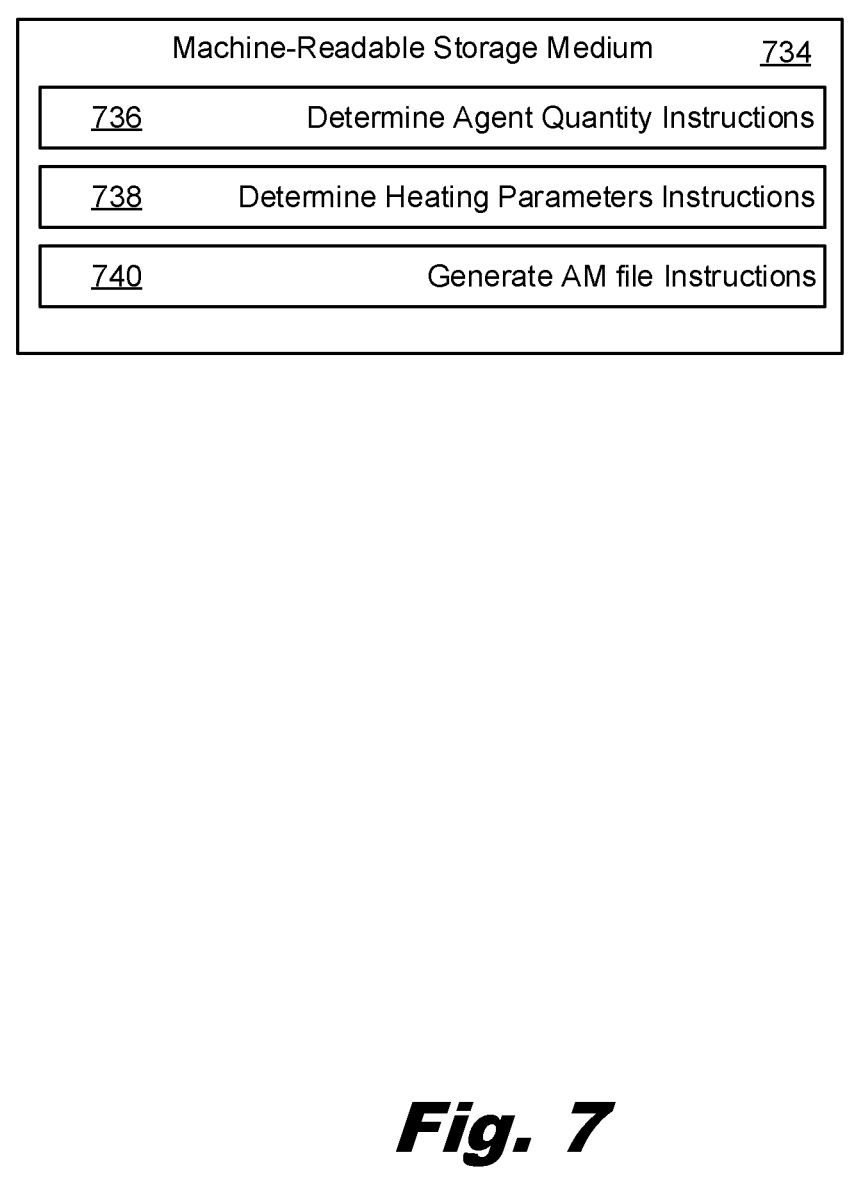

Machine-Readable Storage Medium 734

736 Determine Agent Quantity Instructions

738 Determine Heating Parameters Instructions

740 Generate AM file Instructions

Fig. 7

ADDITIVE MANUFACTURING WITH FUSING AND WARMING ENERGY SOURCES

BACKGROUND

Additive manufacturing devices produce three-dimensional (3D) objects by building up layers of material. Some additive manufacturing devices may be referred to as "3D printing devices" because they use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 1 is a block diagram of an additive manufacturing system with separate fusing and warming energy sources, according to an example of the principles described herein.

FIG. 7 depicts a non-transitory machine-readable storage medium for generating a 3D object with separate fusing and warming energy sources, according to an example of the principles described herein.

Figure 2:
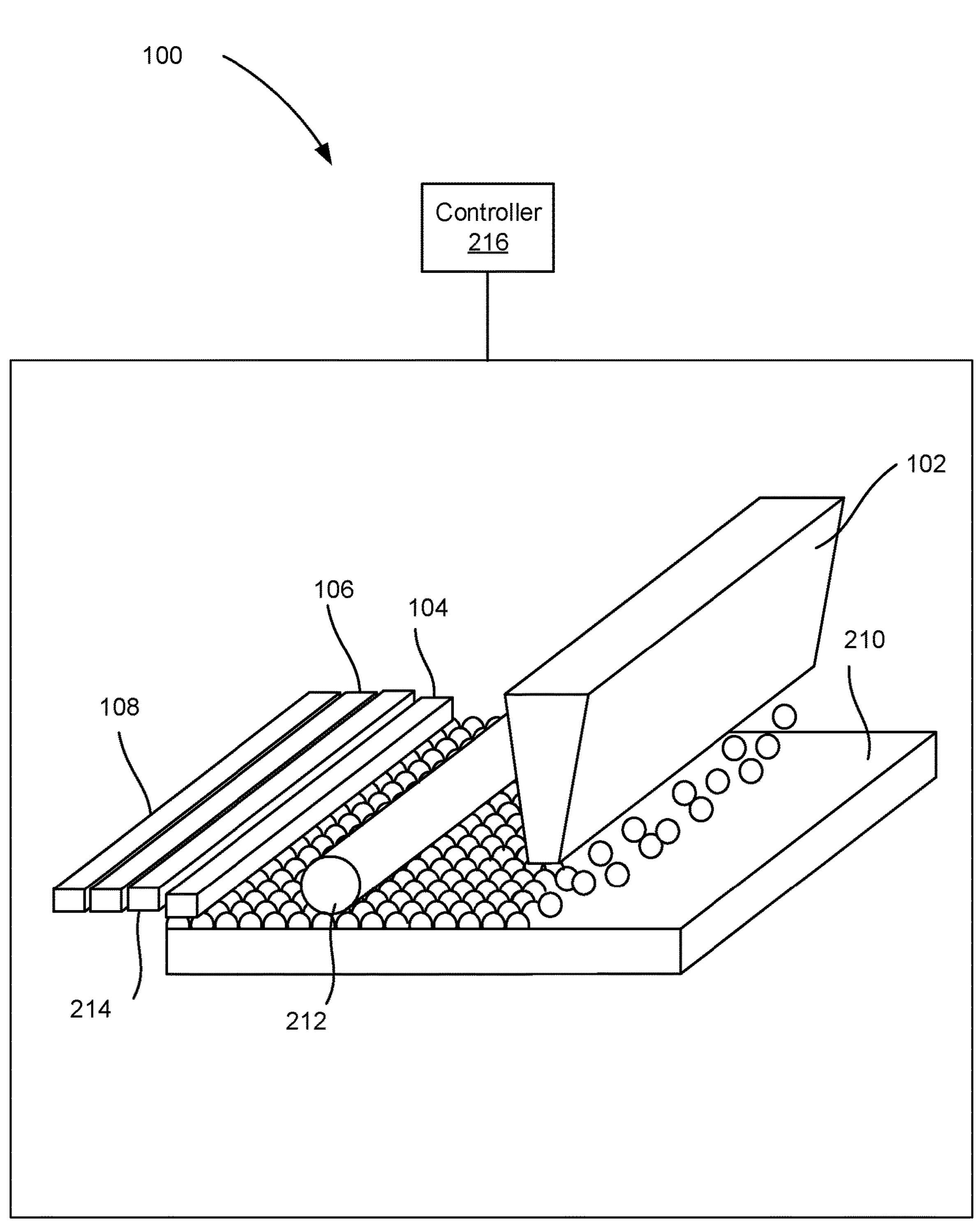
FIG. 2 is an isometric view of an additive manufacturing system with separate fusing and warming energy sources, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing devices form a three-dimensional (3D) object through the solidification of layers of a build material. Additive manufacturing devices make objects based on data in a 3D model of the object generated, for example, with a computer-aided drafting (CAD) computer program product. The model data is transformed into slices, each slice defining portions of a layer of build material that is to be solidified.

In one example, to form the 3D printed object, a build material, which may be powder, is deposited on a bed. A fusing agent is then deposited onto portions of the layer that are to be fused to form a layer of the 3D printed object. The system that carries out this type of additive manufacturing may be referred to as a powder and fusing agent-based system. The fusing agent increases the energy absorption of the portion of the layer of build material on which the agent is deposited. The build material is then exposed to energy such as electromagnetic radiation. The electromagnetic radiation may include infrared light, laser light, light-emitting diode (LED) emitted light, or other suitable electromagnetic radiation. Due to the increased energy absorption properties imparted by the fusing agent, those portions of the build material that have the fusing agent deposited thereon heat to a temperature greater than the melting temperature of the build material. By comparison, the applied energy is neither high enough nor of a suitable wavelength to increase the temperature of the portions of the build material that are free of the fusing agent past the melting temperature of the build material. This process is repeated in a layer-wise fashion to generate a 3D object. The unfused portions of material can then be separated from the fused portions, and the unfused portions may be recycled for subsequent 3D formation operations.

Additive manufacturing has become a respected manufacturing technology for its simplicity, efficacy, and the quality of printed products. In particular, a fusing-agent based system may be able to print a product ten times faster than other additive manufacturing technologies. While such additive manufacturing operations have greatly expanded manufacturing and development possibilities, further developments may make 3D printing a part of even more industries.

For example, fusing-agent based additive manufacturing systems can melt plastic particles to form the object. Such systems rely on the targeted heating of the powder build material achieved with the help of selectively deposited radiation-absorbing fusing agent. That is, regions of the build material that are to form a part of a 3D object have fusing agent deposited onto them. These regions containing the fusing agent reach the build material melting temperature due to the double action of build material absorption of energy and fusing agent absorption of energy. By comparison, regions surrounding the object are just heated by the build material's innate absorption ability, without the increased absorptivity imparted by the fusing agent. While this targeted melting of portions of the build material facilitates 3D printing an object, the difference in build material absorption and fusing agent absorption may result in temperature gradients and thermal stresses across the layer of build material, which may cause object deformation. That is, the difference in innate build material absorption and fusing agent absorption may lead to insufficient heating of the portions of the build material that surround the object. This insufficient heating results in temperature gradients between the melted and un-melted regions of the layer of build material. These thermal gradients may cause deformations in the 3D part and printing failures due to powder spreader collisions into warped objects.

Accordingly, the present specification describes systems and methods for reducing the presence of these temperature gradients and associated deformations. Specifically, the present additive manufacturing system includes a fusing system which heats regions of the layer with fusing agent thereon to, or above, the melting temperature of the build material. The additive manufacturing system also utilizes a warming agent and a matching warming energy source that is different than the fusing agent and fusing energy source. The warming agent increases the absorption of energy from the warming energy source so that the unfused regions become warmer. Thus, the thermal gradient between fused and unfused regions is reduced. The emission spectra of the warming energy source and the fusing energy source may be different, and in some cases mutually exclusive, so as to provide greater control over the thermal profiles of the build material. In some examples, the warming agent may be selected to absorb outside the visible range or to match the build material color so as to not alter the appearance of unfused build material.

Accordingly, the present additive manufacturing system includes a fusing agent delivery device to deliver a fusing agent to areas of a powder bed to be fused. A fusing energy source is to deliver energy that is absorbed by the fusing agent to heat the build material to at least the melting temperature of the build material. A warming energy source is to deliver energy absorbed by a warming agent delivered to, or pre-mixed with, the build material to heat the build material to a temperature below the melting temperature.

Specifically, the present specification describes an additive manufacturing system. The additive manufacturing system includes a build material deposition device to deposit a layer of powder build material. The additive manufacturing system includes a fusing agent deposition device to deposit a fusing agent on a first portion of the layer that is to form a 3D object and a fusing energy source to deliver energy absorbed by the fusing agent to heat the first portion to a melting temperature of the powder build material. The additive manufacturing system also includes a warming energy source to deliver energy absorbed by a second portion of the layer to a temperature below the melting temperature. In this example, the second portion includes a warming agent and the fusing energy source and the warming energy source have different emission spectra.

The present specification also describes a method. According to the method, a controller controls 1) a fusing agent deposition device to deposit a fusing agent on a first portion of a layer of build material that is to form a 3D object and 2) a warming agent deposition device to deposit a warming agent on a second portion of the layer. In this example, the fusing agent has a first absorption spectrum and the warming agent has a second absorption spectrum which may be in the non-visible range. According to the method, the controller controls 1) a warming energy source with a second emission spectrum to deliver energy to the layer of build material such that the second portion is heated to a temperature below the melting temperature and 2) a fusing energy source with a first emission spectrum to deliver energy to the layer of build material such that the first portion is heated to a melting temperature of the powder build material.

The present specification also describes a non-transitory machine-readable storage medium encoded with instructions executable by a processor of a computing device. The machine-readable storage medium includes instructions to, when executed by the processor, cause the processor to determine 1) a quantity of warming agent and fusing agent to deposit on a layer of build material to generate a 3D object and 2) values for parameters for a fusing energy source and a warming energy source which have different emission spectra. Such parameters are determined to 1) heat a first portion of the layer that is to form the 3D object to a melting temperature, or above, of the build material and 2) heat a second portion of the layer that is outside a boundary of the 3D object to below the melting temperature of the build material. The instructions are also executable by the processor to cause the processor to generate an additive manufacturing file to form the 3D object.

Such systems and methods 1) allow the additive manufacturing of 3D objects that are less prone to part warpage and other negative effects of thermal gradients across the layer of build material; 2) provide increased control over the additive manufacturing process; 3) reduce thermal stresses around the 3D object; 4) make the entire build bed temperature more uniform, 5) provide extra heating around small objects and/or below large objects to provide better processing; and 6) may be performed real-time in between formation of distinct layers of the 3D object. However, it is contemplated that the systems and methods disclosed herein may address other matters and deficiencies in a number of technical areas.

As used in the present specification and in the appended claims, the term "controller" may refer to an electronic component which may include a processor and memory. The processor may include the hardware architecture to retrieve executable code from the memory and execute the executable code. As specific examples, the controller as described herein may include computer readable storage medium, and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller cause the controller to implement at least the functionality of additively manufacturing a translucent 3D polymer object with opaque regions as described below.

Turning now to the figures, FIG. 1 is a block diagram of an additive manufacturing system (100) with separate fusing and warming energy sources (106, 108), according to an example of the principles described herein. As described above, the additive manufacturing system (100) may generate 3D objects by fusing powder build material particles together. This fusing is facilitated by a fusing agent which absorbs heat energy from a fusing energy source (106). The increased heat energy drawn to portions of the build material with fusing agent deposited thereon causes the underlying build material particles to fuse together to form a slice of a 3D object.

Accordingly, the additive manufacturing system (100) may include a build material deposition device (102) to deposit layers of powder build material on a bed. This powder build material may be the raw material from which a 3D object is formed. That is, portions of the powder build material are joined together to form a solid structure. The powder build material may be of a variety of types. In some examples, the build material may comprise a polymer material. For example, the polymer material may be a polyamide material. While specific reference is made to a polyamide material, the polymer material may be of other types which are inherently translucent such as polyamide (PA) 11, PA 12, nylons, polypropylene, thermoplastic polyamide (TPA), thermoplastic materials, resin, and the like.

The additive manufacturing system (100) also includes a fusing agent deposition device (104) to deposit a fusing agent on a first portion of the layer that is to form the 3D object. For example, if a 3D object to be formed is a cube, the fusing agent deposition device (104) may deposit the fusing agent in a square pattern to form a square slice of the 3D cube. Fusing agents with different absorption spectra may be implemented in accordance with the principles described herein. For example, the fusing agent may absorb energy in the ultraviolet range, the infrared range, or the visible range. Specific examples of fusing agents are provided below. The fusing agent may be formulated into a jettable ink that includes a stable suspension of nanoparticles.

Structurally, the fusing agent deposition device (104) may include at least one liquid ejection device to distribute the fusing agent onto the layers of build material. A liquid ejection device may include at least one printhead (e.g., a thermal ejection based printhead, a piezoelectric ejection based printhead, etc.). In one example, printheads that are used in inkjet printing devices may be used in the fusing agent deposition device (104). In other examples, the fusing agent deposition device (104) may include other types of liquid ejection devices that selectively eject small volumes of liquid.

The additive manufacturing system (100) also includes a fusing energy source (106) to deliver energy absorbed by the fusing agent to heat the first portion to at least a melting temperature of the powder build material. That is, the fusing energy source (106) may have an emission spectrum that matches the absorption spectrum of the fusing agent such that the fusing agent absorbs the energy emitted by the fusing energy source (106). Due to the increased energy absorption properties imparted by the fusing agent, those portions of the build material that have the fusing agent deposited thereon heat to a temperature equal to or greater than the melting temperature of the build material.

By comparison, those portions of the layer of build material that do not have the fusing agent deposited thereon are cooler. Thus, the use of a fusing system generates thermal gradients across the layer of build material. To reduce or prevent these thermal gradients, those regions outside of the boundaries of the 3D object are heated, albeit to a temperature below the melting temperature of the build material. Accordingly, the additive manufacturing system (100) includes a warming energy source (108) to deliver energy absorbed by a second portion of the layer to a temperature below the melting temperature of the build material.

The second portion may have a warming agent thereon. That is, as the fusing agent increases the fusing energy absorption of the first portion of the layer, the warming agent increases the warming energy absorption of the second portion of the layer. That is, via combination of 1) the innate build material absorption of energy from the warming energy source and from the warming energy source (108) if applicable and 2) the absorption of the warming agent, the temperature of the second portion of the layer of build material rises, but is maintained below the melting temperature of the build material. As such, the thermal gradient between unfused and fused regions is reduced to prevent object warpage and other negative effects of these thermal gradients.

In some examples, the warming agent is pre-mixed with the powder build material. That is, in some examples the warming agent is mixed with the powder build material in some predefined ratio prior to the additive manufacturing operation. In other examples, the warming agent may be formulated into a jettable ink that includes a stable suspension of nanoparticles and is printed on the layer, either in a region surrounding the first portion of the layer (i.e., that portion which is to be the 3D object), or over the entire layer including parts of or a completed first portion.

In either example, the fusing energy source (106) and the warming energy source (108) have different emission spectra, either of which may be in the ultraviolet (UV) range or the infrared (IR) range. For example, the fusing energy source (106) may operate in the UV range while the warming energy source (108) may operate in the IR range. In another example, the fusing energy source (106) may operate in the IR range while the warming energy source (108) operates in the UV range. As yet another example, either of the fusing energy source (106) and the warming energy source (108) may emit in the visible range. Accordingly, any combination of UV, IR, and visible wavelength energy sources may be used for the fusing and warming energy sources. In any example, the respective fusing agent and warming agent absorption spectrum may match the emission spectrum of the associated energy source.

In some examples, the fusing energy source (106) emission spectrum and the warming energy source (108) emission spectrum, and the associated absorption spectrum of the respective agents, may be mutually exclusive. That is, activation of the fusing energy source (106) may not raise the temperature of the second portion of the build material (with warming agent deposited thereon) due to the different absorption and emission spectra of the warming agent and fusing energy source (106), respectively. Similarly, activation of the warming energy source (108) may not raise the temperature of the first portion of the build material (with fusing agent deposited thereon) due to the different absorption and emission spectra of the fusing agent and warming energy source (108), respectively. This mutual exclusivity provides greater control over the thermal profile of the build material so as to reduce the likelihood of object warpage or other negative effects of thermal gradients across the surface of the build material.

That is, irradiation of the fusing agent with the fusing energy source (106) heats the fusing agent and enables selective build material fusing and melting, in some cases without increasing the energy absorption of those portions of the build material that do not form the object. Irradiation of the warming agent with the warming energy source (108) provides accompanying heating of the second portion of build material and provides the above-noted enhancements to the additive manufacturing process including, but not limited to reducing thermal stresses, reducing object warpage, creating a more uniform build material layer temperature, and providing additional heating as desired.

FIG. 2 is an isometric view of an additive manufacturing system (100) with separate fusing and warming energy sources (106, 108), according to an example of the principles described herein. Components of the additive manufacturing system (100) depicted in FIG. 2 may not be drawn to scale and thus, the additive manufacturing system (100) and its components may have different sizes and/or configurations other than as shown therein.

In an example of an additive manufacturing process, a layer of build material may be deposited onto a bed (210). That is, the build material deposition device (102) may drop powder build material onto the bed (210). In some examples, the bed (210) may be moved up and down, e.g., along the z-axis, so that powder build material may be delivered to the bed (210) or to a previously formed layer of powder build material. For each subsequent layer of powder build material to be delivered, the bed (210) may be lowered so that the build material deposition device (102) and re-distributor (212) can operate to place additional powder build material particles onto the bed (210).

The build material deposition device (102) is arranged to dispense a build material layer-by-layer onto the bed (210) to additively form the 3D object. In some examples, the build material deposition device (102) has a length at least as long as a length of the bed (210), such that the build material deposition device (102) can coat the entire bed (210) with a layer of build material in a single pass. While FIG. 2 depicts a particular build material deposition device (102), the build material deposition device (102) may include a variety of devices such as, a supply bed or reservoir, a sieve or rotating slotted rod to provide build material to be spread into a new layer by a re-distributor (212). In one particular example, the build material may be pushed upward adjacent the bed (210) and spread horizontally over the bed (210) by a moving spreading device such as a roller or a blade.

A re-distributor (212) or other mechanism may precisely redistribute (or recoat) the deposited powder build material into a layer of a desired thickness. While FIG. 2 depicts a particular re-distributor (212), the build material re-distributor (212) may be implemented via a variety of electromechanical or mechanical mechanisms, such as doctor blades, rollers, slot dies, extruders, and/or other structures suitable to spread, deposit, and/or otherwise form a coating of the build material in a generally uniform layer relative to the bed (210) or relative to a previously deposited layer of build material.

FIG. 2 also clearly depicts the fusing agent deposition device (104), fusing energy source (106), and warming energy source (108) described above. As described above, in some examples, the warming agent may be formulated into a jettable ink. In this example, the additive manufacturing system (100) includes a warming agent deposition device (214) to deposit the warming agent on the second portion of the layer. Like the fusing agent deposition device (104), the warming agent deposition device (214) may include at least one liquid ejection device to distribute the warming agent onto the layers of build material.

As described above, the fusing agent and the warming agent may have different absorption spectra which may be in the UV range, the IR range, or the visible wavelength range. Specific examples of active ingredients that may be present in the fusing/warming agents and that fall within the UV range include triazine, benzotriazole, benzophenone, ecamsule, avobenzone, titanium dioxide, and zinc oxide. Specific examples of active ingredients that may be present in the fusing/warming agents and that fall within the IR range include Nickel Bis (Dithiolane), antimony doped with tin oxide, silica crystals, carbon nanotubes, carbon nanoparticles, and nanocrystals of calcium fluoride, zinc sulfide, sodium chloride, aluminate, and zinc selenide.

In the examples where the fusing and warming agents are in the non-visible absorption range, the warming and/or fusing agent may not alter the color of the underlying build material. This may be a particularly desirable property for a warming agent so as to not tint the unused build material, which may be recycled in subsequent operations. Note that while specific reference is made to particular UV and IR fusing agents, other UV and IR agents may be implemented in accordance with the principles described herein.

In some examples the energy sources (106, 108) and agent deposition devices (104, 214) may be affixed to scanning carriages which pass over the bed (210). During additive manufacturing, these components operate as the scanning carriages to which they are coupled move along the scanning axis. As depicted in FIG. 2, the additive manufacturing system (100) may include multiple carriages to transport the fusing agent deposition device (104), the warming agent deposition device (214), the fusing energy source (106), and the warming energy source (108). In other examples, such as that depicted in FIG. 5B-5E, all these components may be coupled to a single carriage. While particular reference is made to a particular arrangement of components on carriages, different arrangements may be implemented. For example, the fusing agent deposition device (104) and the warming agent deposition device (214) may be on one carriage while the fusing energy source (106) and the warming energy source (108) may be on a second carriage. As yet another example, the fusing agent deposition device (104) and the fusing energy source (106) may be on one carriage while the warming agent deposition device (214) and the warming energy source (108) may be on a second carriage.

Still further, some components may not be disposed on a carriage, but may be stationary. For example, the fusing energy source (106) and/or the warming energy source (108) may be stationary overhead lamps. As such, the present additive manufacturing system (100) anticipates a variety of arrangements of each of the agent deposition devices (104, 214) and the energy sources (106, 108) as either stationary or moving.

FIG. 2 also depicts a controller (216) which may form part of the additive manufacturing system (100). The controller (216) may include hardware components to control each of the components of the additive manufacturing system (100). That is, each of the previously described physical elements may be operatively connected to a controller (216) which controls the additive manufacturing. Specifically, the controller (216) may direct a build material deposition device (102) and any associated scanning carriages to move to add a layer of powder build material. Further, the controller (216) may send instructions to direct the agent deposition devices (104, 214) and any associated scanning carriages to move to selectively deposit the agent(s) onto the surface of a layer of the build material at specific locations to form a 3D printed object slice. The controller (216) may send instructions to direct the energy sources (106, 108) and any associated scanning carriages to move to expose the build material to respective energy to selectively melt or warm respective portions of the build material.

In some examples, the controller (216) may be disposed on the additive manufacturing device, on a host computing device connected to the additive manufacturing device, or may be remote from the additive manufacturing device. For example, the controller (216) may be located on a server, or servers, that are remote from the host device, additive manufacturing device, or both.

Figure 3:
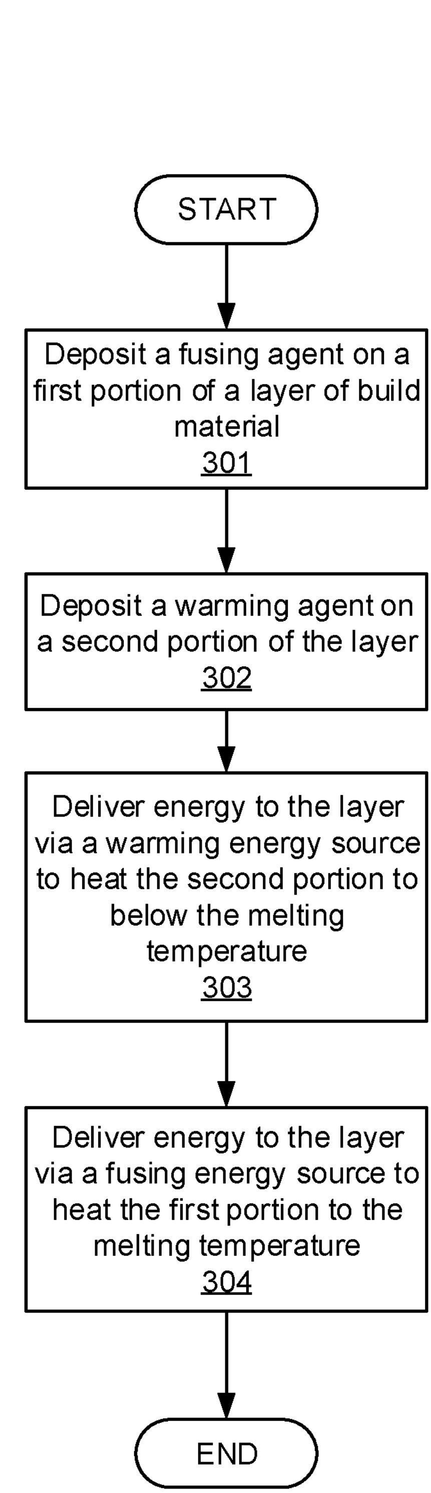
FIG. 3 is a flow chart of a method for generating a three-dimensional (3D) object with separate fusing and warming energy sources, according to an example of the principles described herein.

FIG. 3 is a flow chart of a method (300) for generating a three-dimensional (3D) object with separate fusing and warming energy sources (106, 108), according to an example of the principles described herein. As described above, additive manufacturing involves the layer-wise deposition of build material and fusing certain portions of a layer to form a slice of a 3D object. Accordingly, in this example, the method (300) includes sequentially forming slices of a 3D object. That is, the operations in the method (300) may be repeated for each layer of a 3D object. In some examples, this includes sequentially depositing layers of a powder build material.

The controller (216) of the additive manufacturing system (100) may control a fusing agent deposition device (104) to deposit (block 301) a fusing agent on a first portion of the layer of build material, which first portion is that portion of the layer that is to form the 3D object. In the example where the warming agent is not pre-mixed with the build material, the controller (216) also controls a warming agent deposition device (214) to distribute (block 302) a warming agent on a second portion of the layer. In an example, the warming agent is not deposited on regions of the layer of build material that are to form the 3D object. That is, the warming agent may be deposited around the border of the 3D object. In another example, the warming agent may be deposited across both regions, i.e., the entire layer of build material.

The fusing agent and warming agent may be deposited in any order. That is, the fusing agent may be deposited first, followed by the warming agent. In another example, the warming agent may be deposited followed by the fusing agent. In yet another example, the warming agent and the fusing agent may be deposited simultaneously in a single pass.

The amount of fusing agent and warming agent that is deposited may vary and may depend on any number of characteristics of the additive manufacturing process. For example, the fusing and warming agent deposition amounts may depend on the build material innate absorption ability of both fusing energy and warming energy. That is, some build materials absorb energy and transmit this energy into heat more efficiently, in which case the fusing and warming agents would be applied in smaller concentrations than when build materials are used that are less efficient. As non-limiting examples, the percentage of active ingredient in the warming agent may be between 0.001 and 0.01 weight percent and the percentage of active ingredient in the fusing agent may be between 0.01 and 10 weight percent.

In some examples, the warming agent is non-uniformly deposited across the second portion. As a particular example, a higher concentration of warming agent may be deposited near the portion of the layer that is to form the 3D object with a concentration decreasing as distance away from the object regions increases. As the object region is that region of the layer of build material that is likely to be hottest, it may be desirable for the immediately adjacent non-object region to be closer in temperature to the object region, while those non-object regions that are farther away from the object region are allowed to have a greater temperature difference from the object region.

In another example, the warming agent may be deposited in a pattern, such as matrix pattern. Patterning the warming agent in this fashion may provide for different final temperatures of the second portion, i.e., the portion on which the warming agent is deposited. Accordingly, by depositing the warming agent in an outward gradient and/or in a pattern such as a matrix pattern, the additive manufacturing system (100) provides a parameter that may be adjusted so as to achieve a target thermal profile of the layer of build material.

In another example, the warming agent may be halftoned, which is a deposition method to control the printed amount on a microscale. As with patterning, halftoning may allow for an increased degree of control over the amount of heat absorbed by the respective energy sources. Accordingly, by depositing the warming agent in a halftone, the additive manufacturing system (100) provides another parameter that may be adjusted so as to achieve a target thermal profile.

In yet another example, the warming agent may be deposited on layers that do not include fusing agent. For example, prior to generating layers wherein the 3D object is to be formed, the build material deposition device (102) may deposit a few layers of build material to act as a support for the to-be-printed 3D object. As this build material is free of any agent, the temperature gradient between a support layer and a layer that is to contain fusing agent may lead to the aforementioned warp-causing thermal gradients. Accordingly, the warming agent may be found, either deposited on, or pre-mixed with, the build material on layers that are to surround object layers.

As noted above, the fusing agent may have a first absorption spectrum and the warming agent may have a second absorption spectrum, which second absorption spectrum may be in a non-visible range. As such, the warming agent may avoid tinting the powder build material. As such, unfused build material with warming agent deposited thereon may be recycled more readily when a non-tinting warming agent is used.

Also as described above, the absorption spectra of the fusing agent and the warming agent may be different, and in some cases may not overlap. As described above, one of the warming agent and the fusing agent may be in the UV range, IR range, or visible range with the other of the warming agent and fusing agent being in a different of the aforementioned ranges. For example, the fusing agent/warming agent relationship may be UV/IR, UV/visible, IR/UV, IR/visible, visible/UV, or visible/IR. Implementing agents with different, and non-overlapping, absorption spectra provides greater control over the heating of the different regions of the build material as the temperature of each region may be individually and independently monitored and controlled.

Following agent deposition, the controller (216) may control a warming energy source (108) with a second emission spectrum to deliver (block 303) energy to the layer of build material such that the second portion is heated to a temperature below the melting temperature of the powder build material. The controller (216) may also control a fusing energy source (106) with a first emission spectrum to deliver (block 304) energy to the layer of build material such that the first portion is heated to, or above, the melting temperature.

The emission spectrum of the fusing and warming energy sources may match the absorption spectrum of the associated agents. As noted, doing so provides individualized control over distinct regions of the layer of build material.

As such, one of the fusing energy source (106) and the warming energy source (108) may be in the UV range, one of the fusing energy source (106) and the warming energy source (108) may be in the IR range, and/or one of the fusing energy source (106) and warming energy source (108) may be in the visible range.

As with the agent deposition, the delivery of energy of the layer of build material may be in any order. That is, the fusing energy source (106) may be activated first, followed by the warming energy source (108). In another example, the warming energy source (108) may be activated followed by the fusing energy source (106). In yet another example, the fusing energy source (106) and the warming energy source (108) may be activated simultaneously in a single pass.

These operations (blocks 301, 302, 303, 304) may be repeated to iteratively to build up multiple patterned layers and to form the 3D object. For example, the controller (216) may execute instructions to cause the bed (210) to be lowered to enable the next layer of powder build material to be spread. In addition, following the lowering of the bed (210), the controller (216) May 1) control the build material deposition device (102) to deposit a layer of powder build material on top of the previously formed layer, 2) control the agent deposition devices (104, 214) to deposit agents, and 3) control the energy sources (106, 108) to deliver energy to the build material. As such, the present method (300) provides for customized operation of an additive manufacturing system (100) to generate a 3D object that avoids thermal stresses, avoids object warpage and provides other enhancements such as object support and a more uniform build material layer temperature among others.

Note that while FIG. 3 depicts operations in a particular order, the operations may be carried out in different orders. For example, while FIG. 3 depicts deposition (block 301) of a fusing agent followed by deposition (block 302) of a warming agent and exposure by respective energy sources, the order may be altered. For example, the warming agent may be deposited and exposed followed by deposition and exposure of the fusing agent.

Figure 4:
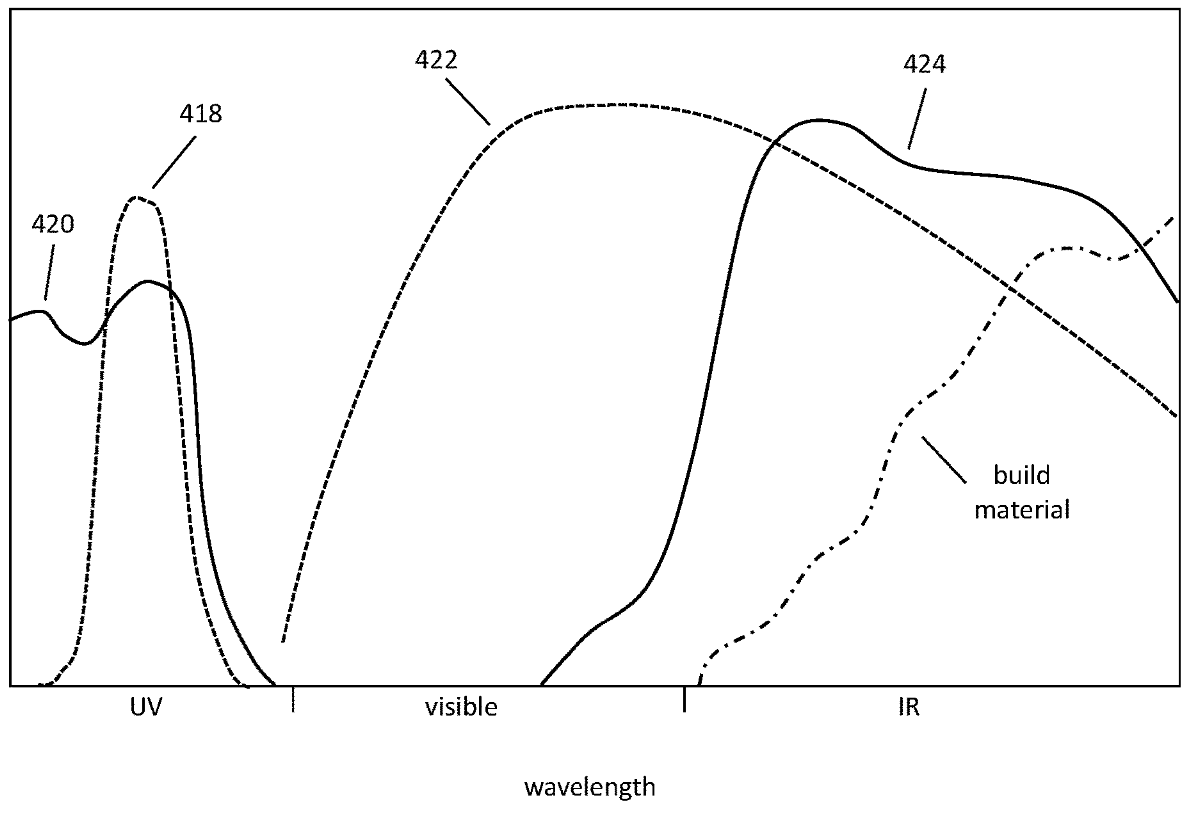
FIG. 4 is a graph depicting the emission and absorption spectra of different fusing and warming systems, according to an example of the principles described herein.

FIG. 4 is a graph depicting the emission and absorption spectra of different fusing and warming systems, according to an example of the principles described herein. Specifically, FIG. 4 depicts the absorption spectrum (420) of a warming agent alongside the emission spectrum (418) of the warming energy source (108). FIG. 4 also depicts the absorption spectrum (424) of a fusing agent alongside the emission spectrum (422) of the fusing energy source (106). As depicted in FIG. 4, the first absorption spectrum, i.e., the fusing agent absorption spectrum (424) and the second absorption spectrum, i.e., the warming agent absorption spectrum (420) may be unique and mutually exclusive. Similarly, the first emission spectrum, i.e., the fusing energy source (106) emission spectrum (422) and the second emission spectrum, i.e., the warming energy source emission spectrum (418) may be unique and mutually exclusive. When these spectra are non-overlapping, there may be a minimal cross-effect. That is, the warming energy source (108) may not increase the temperature of portions of the build material with no warming agent deposited thereon besides the natural absorption of the build material, while the fusing energy source (106) may not increase the temperature of portions of the build material with no fusing agent deposited thereon besides the natural absorption of the build material. This is what facilitates the individualized region-based temperature control. FIG. 4 also depicts the absorption spectrum of the build material.

FIGS. 5A-5E depict the formation of a layer of a 3D object using different fusing and warming systems, according to an example of the principles described herein. FIGS. 5A-5E also depict an additional component of the additive manufacturing system (100). Specifically, the additive manufacturing system (100) may include a thermal sensor (528) to track a temperature of the layer of powder build material. The thermal sensor (528) may be able to track and monitor the temperature of different regions of the layer of build material. That is, the thermal sensor (528) may include discrete sensors or cameras to monitor the temperature of the different regions of the layer of build material.

As such, the controller (216) may alter agent deposition parameters, energy source activation parameters, or a combination thereof based on the output of the thermal sensor (528) while the 3D object is being formed. For example, after completion of a layer, the thermal sensor (528) may detect that unfused build material has a temperature difference relative to the fused build material temperature that may result in object warpage. Based on this output, the controller (216) may increase a quantity of warming agent deposited to reduce this thermal gradient. While particular reference is made to per-layer real-time control, in some examples, the closed loop feedback may occur within a single layer.

Figure 5A:
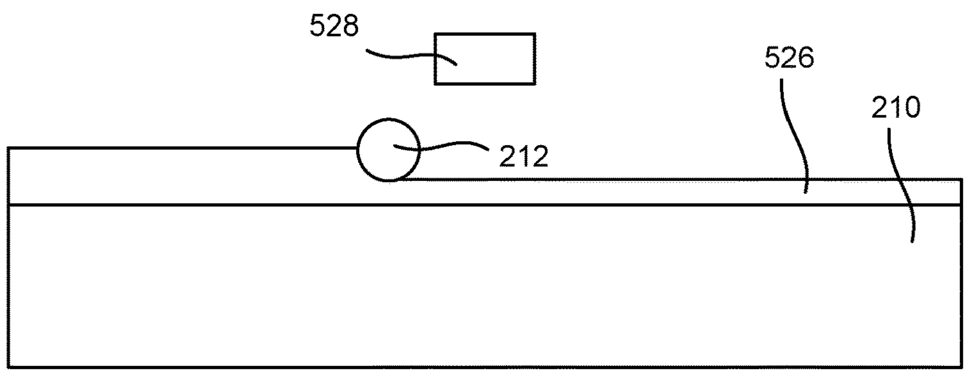
FIGS. 5A-5E depict the formation of a layer of a 3D object using different fusing and warming systems, according to an example of the principles described herein.

As depicted in FIG. 5A, a re-distributor (212) may smooth out build material deposited by a build material deposition device (102) to form a smooth layer (526). This layer (526) may define a slice of the 3D object to be formed.

As described above and as depicted in FIG. 5B, the additive manufacturing system (100) may include a single carriage that transports the fusing agent deposition device (104), the warming agent deposition device (214), the fusing energy source (106), and the warming energy source (108) across the build material.

Figure 5B:
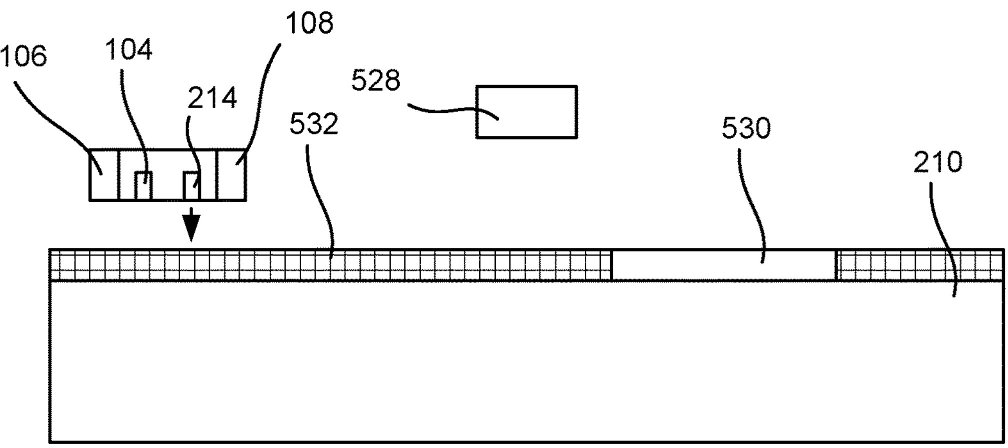
Figure 5C:
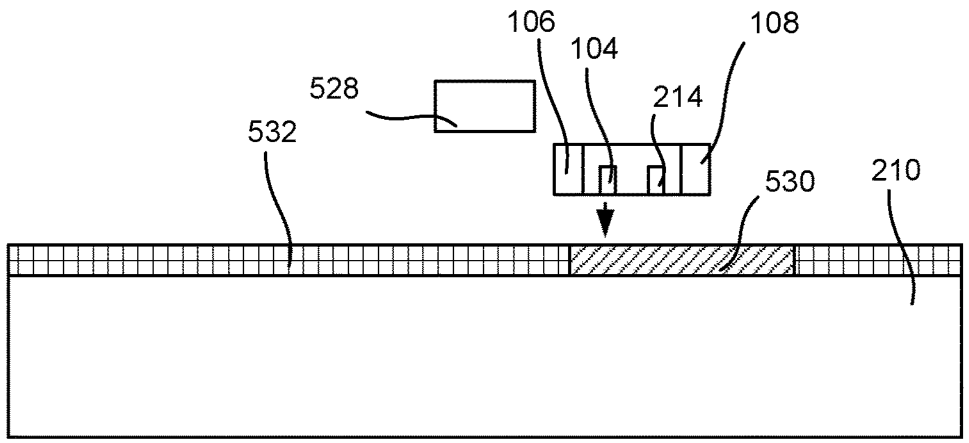

During a first pass depicted in FIG. 5B, the warming agent deposition device (214) may deposit warming agent on non-object regions (532) of the layer of build material. In a second pass depicted in FIG. 5C, the fusing agent deposition device (104) may deposit fusing agent on object regions (530) of the layer of build material. In FIGS. 5B-5E, those portions that are intended to form the 3D object have a diagonal fill while those portions that are not to form the 3D object have a grid fill.

Figure 5D:
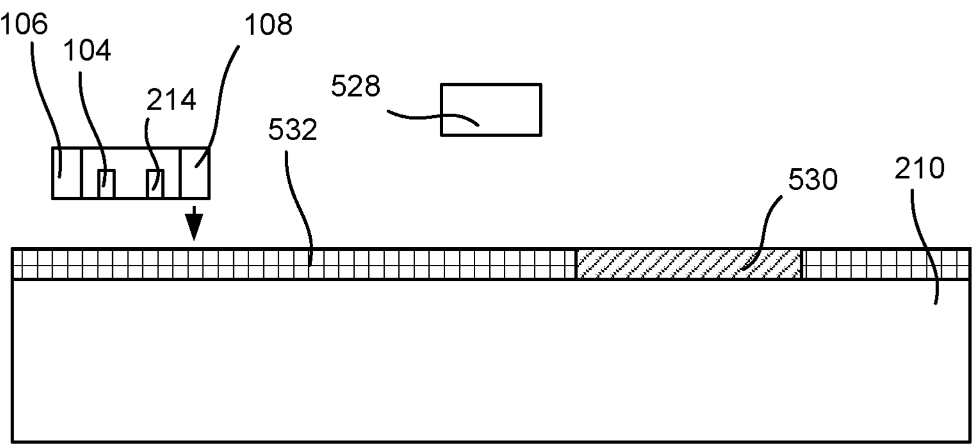

During a third pass depicted in FIG. 5D, the warming energy source (108) may deliver energy such that the non-object regions (532) warm to a temperature below the melting temperature of the build material. As the fusing agent may have an absorption spectrum that is unique and mutually exclusive from the emission spectrum of the warming energy source (108), the object regions (530) may not warm during warming energy source (108) activation.

Figure 5E:
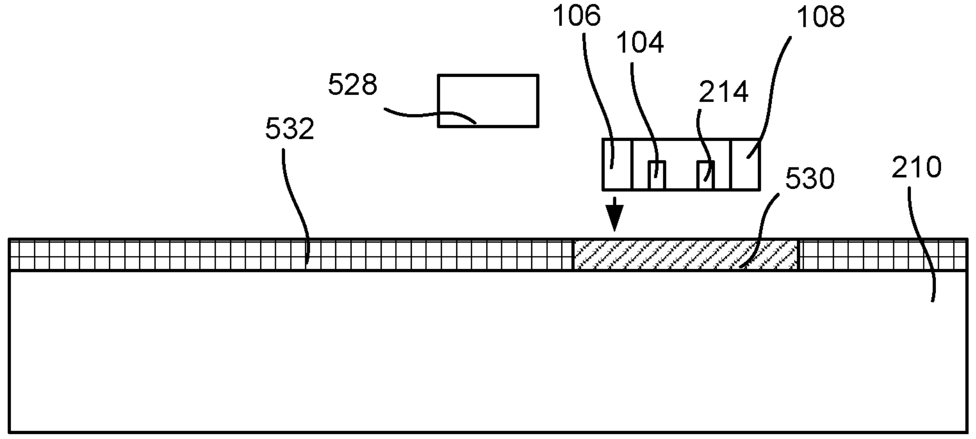

During a fourth pass depicted in FIG. 5E, the fusing energy source (106) may deliver energy such that the object regions (530) warm to a temperature that is at or above the melting temperature of the build material and solidify to form a layer of the 3D object. As the warming agent may have an absorption spectrum that is unique and mutually exclusive from the emission spectrum of the fusing energy source (106), the non-object regions (532) may not warm during fusing energy source (106) activation.

While FIGS. 5B-5E depict the activation of these different components in separate passes, in some examples, each component may be activated in a single pass of the carriage over the build material.

Figure 6:
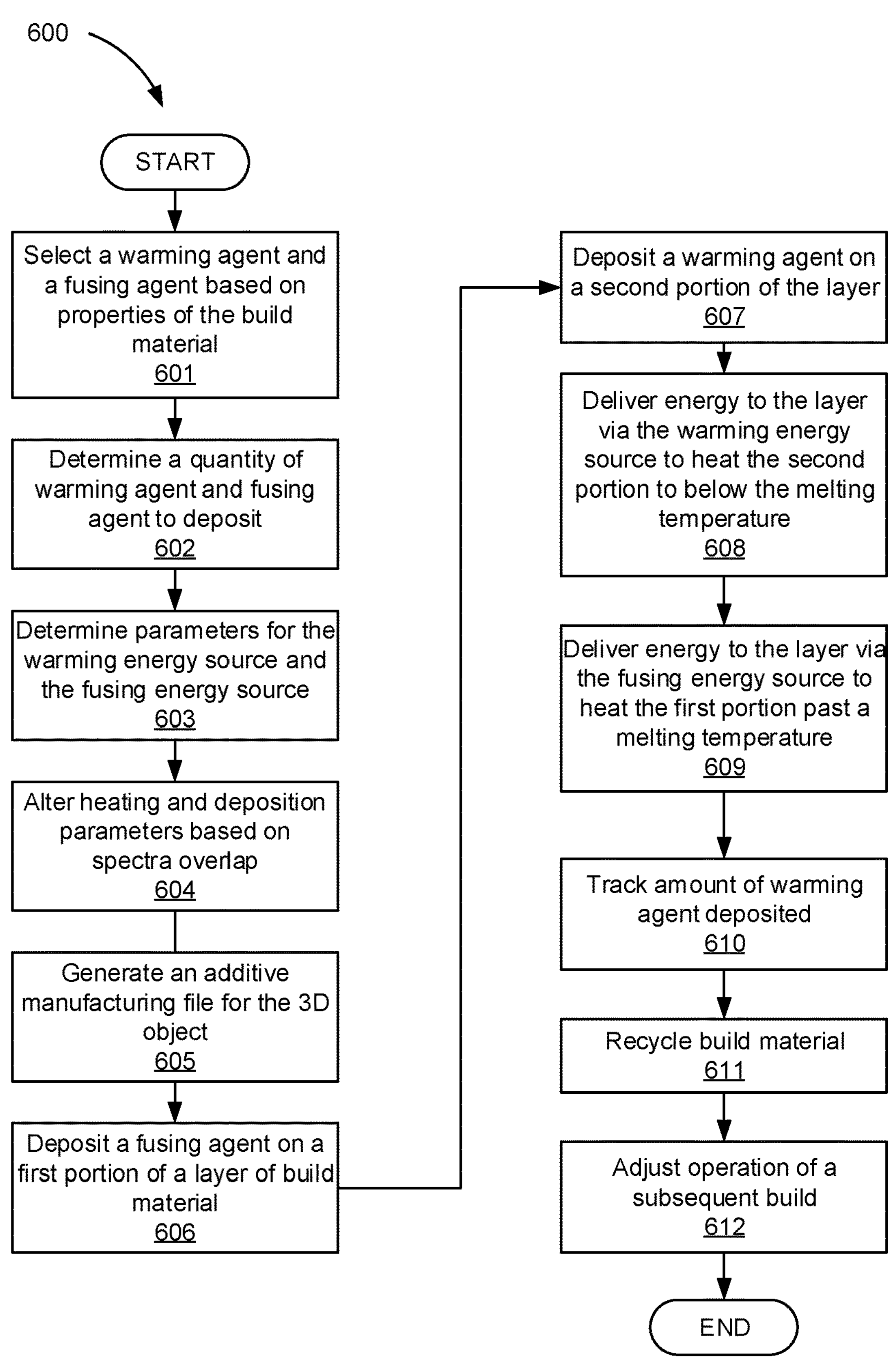
FIG. 6 is a flow chart of a method for generating a 3D object with separate fusing and warming energy sources, according to an example of the principles described herein.

FIG. 6 is a flow chart of a method (600) for generating a 3D object with separate fusing and warming energy sources (106, 108), according to an example of the principles described herein. The method (600) may include selecting (block 601) a warming agent and a fusing agent based on properties of the build material. That is, each build material may have different innate absorption abilities. Accordingly, the warming agent and fusing agent may be selected based on the build material absorption abilities in order to control the heating and overall thermal profile for the object and non-object regions of build material.

In addition to selecting the warming agent and fusing agent, the method (600) also includes determining (block 602) a quantity of warming agent and fusing agent to deposit on a layer (526) of build material to generate the 3D object. In some examples, this may include extracting such information from an object file. That is, the object file for a 3D object may include geometric properties such as desired dimensions, tolerances, and any number of mechanical properties for the 3D object. Accordingly, the controller (216) may extract from the object file, the identification of data relating to the 3D object. Based on this information, the controller (216) may determine (block 602) a quantity of warming agent and fusing agent to form the 3D object with the desired dimensions, tolerances, and mechanical properties, etc. Still further, as different build materials heat differently, the amount of warming agent and the amount of fusing agent used to achieve fusing while preventing thermal gradients may be dependent upon the build material.

Similarly, the method (600) includes determining (block 603) parameters for a fusing energy source (106) and a warming energy source (108). Again, these parameters may be based on the object file and may be determined so as to heat a first portion of the layer that is to form the 3D object to at least a melting temperature of the build material and heat a second portion of the layer of build material that is outside a boundary of the 3D object to below the melting temperature.

The method (600) includes altering (block 604) heating and deposition parameters based on spectrum overlap. As described above and as depicted in FIG. 4, in some examples, the absorption/emission spectra of the fusing and warming systems may be mutually exclusive. However, in other examples, the first absorption spectrum, i.e., the fusing agent absorption spectrum (424) and the second absorption spectrum, i.e., warming agent absorption spectrum (420) may overlap. In this scenario, the portion of the layer with the warming agent deposited thereon may absorb energy from the fusing energy source (106) and thus raise in temperature when the fusing energy source (106) is activated. Similarly, the portion of the layer with the fusing agent deposited thereon may absorb energy from the warming energy source (108) and thus raise in temperature when the warming energy source (108) is activated. If unaccounted for, this overlap may introduce variability into the thermal control of the layer of build material. Accordingly, in this example the controller (216) may alter the warming energy source (108) parameters and warming agent deposition based on an amount of absorption of the second portion from the fusing energy source (106) and may alter fusing energy source (106) parameters and fusing agent deposition based on an amount of absorption of the first portion from the warming energy source (108). This may include reducing the amount of agent deposited and/or the energy delivery based on the overlap of another agent. The method (600) includes generating (block 605) an additive manufacturing file for the 3D object, which is a file usable by the additive manufacturing system (100) to generate the 3D object.

The method (600) includes depositing (block 606) the fusing agent, depositing (block 607) the warming agent, delivering (block 608 energy via the warming energy source (108), and delivering (block 609) energy via the fusing energy source (106) as described above in connection with FIG. 3.

In some examples, the unfused build material may be recycled for re-use. However, in this case, the unfused build material may include warming agent deposited thereon. If unaccounted for, the warming agent in the unfused build material may alter the thermal profile of the build material in subsequent builds. For example, when using 100% recycled build material in the subsequent build, it may not be necessary to apply additional warming agent as warming agent is already present in the build material.

Accordingly, the method (600) includes tracking (block 610) the amount of warming agent deposited on the layer of build material. Such tracking may include recording and indicating how much warming agent was deposited, how many times the unfused build material has been recycled, and the mixing ratio of the recycled build material with fresh build material. The method (600) also includes recycling (block 611) the build material and adjusting (block 612) operation of a subsequent build based on the amount of warming agent deposited on the layer of build material. Such adjustments may be the amount of warming agent deposited during the subsequent build, an amount of fusing agent deposited in the subsequent build, warming energy source (108) parameters in the subsequent build, fusing energy source (106) parameters in the subsequent build, a ratio of recycled build material and fresh build material; or a combination thereof. For example, when mixing build materials having different concentrations of warming agent, the ratios of these different build materials should be selected to avoid exceeding the desired concentration of warming agent in the mixture. In another example, the warming agent may be removed from the build material, i.e., washed, before it is used. This may include washing via a chemical solvent that removes the warming agent from the recycled powder build material. As such, the present method (600) provides for customized operation of an additive manufacturing system (100) to generate a 3D object that avoids thermal stresses, avoids object warpage and provides other enhancements such as object support and a more uniform build material layer temperature among others. As noted above, while FIG. 6 depicts operations in a particular order, the operations may be carried out in different orders.

FIG. 7 depicts a non-transitory machine-readable storage medium (734) for generating a 3D object with separate fusing and warming energy sources (106, 108), according to an example of the principles described herein. To achieve its desired functionality, the additive manufacturing system (100) includes various hardware components. Specifically, the additive manufacturing system (100) includes a processor and a machine-readable storage medium (734). The machine-readable storage medium (734) is communicatively coupled to the processor. The machine-readable storage medium (734) includes a number of instructions (736, 738, 740) for performing a designated function. The machine-readable storage medium (734) causes the processor to execute the designated function of the instructions (736, 738, 740).

Referring to FIG. 7, determine agent quantity instructions (736), when executed by the processor, cause the processor to determine a quantity of warming agent and fusing agent to deposit on a layer of build material to generate a 3D object. Determine heating parameters instructions (738), when executed by the processor, may cause the processor to determine parameters for a fusing energy source (106) and a warming energy source (108) which have different emission spectra to heat a first portion of the layer that is to form the 3D object to at least a melting temperature of the build material and heat a second portion of the layer that is outside the boundary of the 3D object to below the melting temperature. Generate additive manufacturing (AM) file instructions (740), when executed by the processor, may cause the processor to generate additive manufacturing instructions to form the 3D object.

Such systems and methods 1) allow the additive manufacturing of 3D objects that are less prone to part warpage and other negative effects of thermal gradients across the layer of build material; 2) provide increased control over the additive manufacturing process; and 3) may be performed real-time in between formation of distinct layers of the 3D object. However, it is contemplated that the systems and methods disclosed herein may address other matters and deficiencies in a number of technical areas.

What is claimed is:

1. A method comprising:

controlling a fusing agent deposition device to deposit a fusing agent on a first portion of a layer of build material that is to form a three-dimensional (3D) object, wherein the fusing agent has a first absorption spectrum;

controlling a warming agent deposition device to deposit a warming agent on a second portion of the layer, wherein the warming agent has a second absorption spectrum different than the first absorption spectrum;

controlling a warming energy source with a second emission spectrum to deliver energy to the layer of build material such that the second portion is heated to a temperature below a melting temperature of the build material; and controlling a fusing energy source with a first emission spectrum to deliver energy to the layer of build material such that the first portion is heated to the melting temperature, wherein controlling of the warming agent deposition device to deposit the warming agent and controlling of the warming energy source with the second emission spectrum are based on an amount of absorption of the second portion from the fusing energy source, and wherein controlling of the fusing agent deposition device to deposit the fusing agent and controlling of the fusing energy source with the first emission spectrum are based on an amount of absorption of the first portion from the warming energy source.

2. The method of claim 1, wherein:

the first absorption spectrum and the second absorption spectrum overlap.

3. The method of claim 1, further comprising:

tracking an amount of warming agent deposited on the layer of build material;

recycling the build material; and adjusting operation of a subsequent build based on the amount of warming agent deposited on the layer of build material by adjusting:

an amount of warming agent deposited in the subsequent build;

an amount of fusing agent deposited in the subsequent build;

warming energy source parameters in the subsequent build;

fusing energy source parameters in the subsequent build;

a ratio of recycled build material and fresh build material; or a combination thereof.

4. The method of claim 3, further comprising washing the recycled build material for use in the subsequent build.

5. The method of claim 1, wherein the warming agent is non-uniformly deposited across the second portion.

6. A non-transitory machine-readable storage medium storing instructions that when by a processor, cause the processor to perform processing comprising:

controlling a fusing agent deposition device to deposit a fusing agent on a first portion of a layer of build material that is to form a three-dimensional (3D) object, wherein the fusing agent has a first absorption spectrum;

controlling a warming agent deposition device to deposit a warming agent on a second portion of the layer, wherein the warming agent has a second absorption spectrum different than the first absorption spectrum;

controlling a warming energy source with a second emission spectrum to deliver energy to the layer of build material such that the second portion is heated to a temperature below a melting temperature of the build material; and controlling a fusing energy source with a first emission spectrum to deliver energy to the layer of build material such that the first portion is heated to the melting temperature, wherein controlling the warming agent deposition device to deposit the warming agent and controlling the warming energy source with the second emission spectrum are based on an amount of absorption of the second portion from the fusing energy source, and wherein controlling the fusing agent deposition device to deposit the fusing agent and controlling the fusing energy source with the first emission spectrum are based on an amount of absorption of the first portion from the warming energy source.

7. The non-transitory machine-readable storage medium of claim 6, wherein:

the first absorption spectrum and the second absorption spectrum overlap.

8. The non-transitory machine-readable storage medium of claim 6, wherein the processing further comprises:

tracking an amount of warming agent deposited on the layer of build material;

recycling the build material; and adjusting operation of a subsequent build based on the amount of warming agent deposited on the layer of build material by adjusting:

an amount of warming agent deposited in the subsequent build;

an amount of fusing agent deposited in the subsequent build;

warming energy source parameters in the subsequent build;

fusing energy source parameters in the subsequent build;

a ratio of recycled build material and fresh build material; or a combination thereof.

9. The non-transitory machine-readable storage medium of claim 8, wherein the processing further comprises washing the recycled build material for use in the subsequent build.

10. The non-transitory machine-readable storage medium of claim 6, wherein the warming agent is non-uniformly deposited across the second portion.

11. An additive manufacturing system comprising:

a fusing agent deposition device configured to deposit a fusing agent on a first portion of a layer of build material that is to form a three-dimensional (3D) object, wherein the fusing agent has a first absorption spectrum;

a warming agent deposition device configured to deposit a warming agent on a second portion of the layer, wherein the warming agent has a second absorption spectrum different than the first absorption spectrum;

a warming energy source with a second emission spectrum configured to deliver energy to the layer of build material such that the second portion is heated to a temperature below a melting temperature of the build material; and a fusing energy source with a first emission spectrum configured to deliver energy to the layer of build material such that the first portion is heated to the melting temperature, wherein the warming agent deposition device is to deposit the warming agent and the warming energy source is to deliver the energy with the second emission spectrum based on an amount of absorption of the second portion from the fusing energy source, and wherein the fusing agent deposition device is to deposit the fusing agent and the fusing energy source is to deliver the energy with the first emission spectrum based on an amount of absorption of the first portion from the warming energy source.

12. The additive manufacturing system of claim 11, wherein:

the first absorption spectrum and the second absorption spectrum overlap.

13. The additive manufacturing system of claim 11, wherein the warming agent is non-uniformly deposited across the second portion.

* * * * *